(12) United States Patent
Keller et al.

(10) Patent No.: US 7,740,931 B2
(45) Date of Patent: Jun. 22, 2010

(54) FIRE PROTECTION GATE AND CORRELATED FIRE PROTECTION INSET

(76) Inventors: Horst Keller, Holländergrund 1, Östringen (DE) 76684; Ralph Beyer, Dorfplatz 5, Lüningshagen (DE) 18239; Gerald Amannt, Avenue de Crousaz 2F, Lausanne (CH) 1010; Jean-Luc Bernard, 51, Rue Andre Oudin, Giencourt Breuil le Vert (FR) 60600

( * ) Notice: Subject to any disclaimer, the term of this patent is extended or adjusted under 35 U.S.C. 154(b) by 394 days.

(21) Appl. No.: 10/575,019

(22) PCT Filed: Oct. 4, 2004

(86) PCT No.: PCT/EP2004/011062

§ 371 (c)(1), (2), (4) Date: Apr. 15, 2008

(87) PCT Pub. No.: WO2005/035459

PCT Pub. Date: Apr. 21, 2005

(65) Prior Publication Data

US 2008/0196638 A1      Aug. 21, 2008

(30) Foreign Application Priority Data

Oct. 6, 2003   (EP) ................................. 03022609
Jan. 7, 2004   (FR) ................................. 04 00084

(51) Int. Cl.
    *D04H 1/00*   (2006.01)
(52) U.S. Cl. .................. 428/292.1; 52/456; 52/784.11; 109/65

(58) Field of Classification Search .............. 428/292.1, 428/920, 921; 109/65; 52/456, 784.11
See application file for complete search history.

(56) References Cited

U.S. PATENT DOCUMENTS

| 3,566,564 A | * | 3/1971 | Gaeth et al. ................... 52/232 |
| 4,203,264 A | * | 5/1980 | Kiefer et al. ..................... 52/1 |
| 4,467,005 A | | 8/1984 | Pusch et al. |

(Continued)

FOREIGN PATENT DOCUMENTS

CH          659755          2/1987

(Continued)

OTHER PUBLICATIONS

Official Action for U.S. Appl. No. 10/575,018, mailed Nov. 10, 2009.

(Continued)

*Primary Examiner*—N. Edwards
(74) *Attorney, Agent, or Firm*—Sheridan Ross P.C.

(57) ABSTRACT

At a fire protection gate with an encompassing structure and bilateral steel plate shells, between which a fire protection inset is provided, consisting of at least an insulating element in the form of a plate of mineral fibers, soluble in a physical milieu and reinforced with a binding agent, the composition of the mineral fibers of said insulating element features an alkali/earth alkali-mass relation of <1 and the fiber structure of said insulating element is determined by an average geometrical fiber diameter of $\leqq 4$ µm, a gross density in the range of 60 to 130 kg/m$^3$ and a portion of the binding agent, relative to the fiber mass, in the range of 1 to 3 weight %.

17 Claims, 3 Drawing Sheets

U.S. PATENT DOCUMENTS

| | | | |
|---|---|---|---|
| 4,928,898 | A | 5/1990 | Audren et al. |
| 5,243,126 | A | 9/1993 | Chow et al. |
| 5,346,868 | A | 9/1994 | Eschner |
| 5,554,324 | A | 9/1996 | Bernard et al. |
| 5,601,628 | A | 2/1997 | Battigelli et al. |
| 5,614,449 | A | 3/1997 | Jensen |
| 5,900,298 | A | 5/1999 | Syme et al. |
| 5,962,354 | A | 10/1999 | Fyles et al. |
| 6,074,967 | A | 6/2000 | Erskine |
| 6,158,249 | A | 12/2000 | Battigelli et al. |
| 6,284,684 | B1 | 9/2001 | Vignesoult et al. |
| 6,358,872 | B1 | 3/2002 | Karppinen et al. |
| 6,512,173 | B1 | 1/2003 | Muth |
| 6,797,356 | B2 | 9/2004 | Zupon et al. |
| 6,851,283 | B2 | 2/2005 | Bracchini et al. |
| 2007/0093155 | A1 | 4/2007 | Bihy et al. |
| 2007/0110979 | A1* | 5/2007 | Clark et al. ............. 428/292.1 |
| 2007/0184740 | A1 | 8/2007 | Keller et al. |
| 2008/0014422 | A1 | 1/2008 | Keller et al. |
| 2008/0196638 | A1* | 8/2008 | Keller et al. ................. 109/65 |
| 2009/0044471 | A1* | 2/2009 | Harlin et al. ............ 52/309.13 |

FOREIGN PATENT DOCUMENTS

| | | |
|---|---|---|
| DE | 3612857 | 9/1986 |
| DE | 19604238 | 8/1997 |
| DE | 29711054 | 2/1998 |
| DE | 19747622 | 4/1999 |
| DE | 19942882 | 6/2001 |
| DE | 10256434 | 6/2003 |
| EP | 0123965 | 11/1984 |
| EP | 0399320 | 11/1990 |
| EP | 0525816 | 8/1992 |
| EP | 0551476 | 7/1993 |
| EP | 0583791 | 2/1994 |
| EP | 0583792 | 2/1994 |
| EP | 741003 | 11/1996 |
| EP | 0821755 | 2/1998 |
| EP | 1097807 | 5/2001 |
| EP | 1157974 | 11/2001 |
| EP | 1182177 | 2/2002 |
| EP | 1296002 | 3/2003 |
| WO | WO 89/12032 | 12/1989 |
| WO | WO 94/04468 | 3/1994 |
| WO | WO 95/32925 | 12/1995 |
| WO | WO 02/070417 | 9/2002 |
| WO | WO 03/047850 | 6/2003 |

OTHER PUBLICATIONS

Official Action for U.S. Appl. No. 10/575,009, mailed Oct. 6, 2009.
Official Action for U.S. Appl. No. 10/575,009, mailed Feb. 6, 2009.
Official Action for U.S. Appl. No. 10/575,018, mailed Feb. 5, 2009.
Official Action for U.S. Appl. No. 10/576,902, mailed Dec. 12, 2008.
Balcerowiak et al. "Thermal Stability of Binder For Mineral Wool Insulations", Journal of Thermal Analysis, 1995, vol. 43, pp. 299-303.
Written Opinion (including translation) for International (PCT) Patent Application No. PCT/EP2004/011062.
International Preliminary Report on Patentability (including translation) for International (PCT) Patent Application No. PCT/EP2004/011062.
International Search Report for International (PCT) Patent Application No. PCT/EP2004/011061.
Written Opinion (including translation) for International (PCT) Patent Application No. PCT/EP2004/011061.
International Preliminary Report on Patentability (including translation) for International (PCT) Patent Application No. PCT/EP2004/011061.
International Search Report for International (PCT) Patent Application No. PCT/EP2004/011063.
Written Opinion (including translation) for International (PCT) Patent Application No. PCT/EP2004/011063.
International Preliminary Report on Patentability (including translation) for International (PCT) Patent Application No. PCT/EP2004/011063.
International Search Report for International (PCT) Patent Application No. PCT/EP2004/011781.
Written Opinion for International (PCT) Patent Application No. PCT/EP2004/011781.
International Preliminary Report on Patentability for International (PCT) Patent Application No. PCT/EP2004/011781.
Official Action for U.S. Appl. No. 10/575,009, mailed Jun. 25, 2008.
Official Action for U.S. Appl. No. 10/575,018, mailed Jul. 24, 2008.

* cited by examiner

Fig. 1
Fig. 2
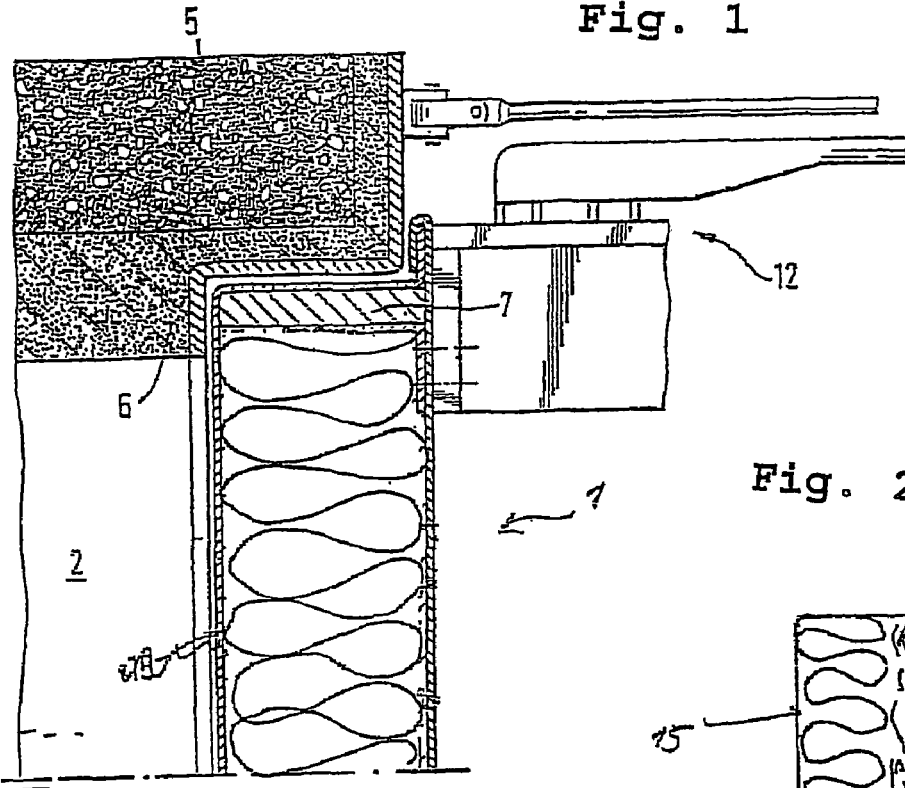
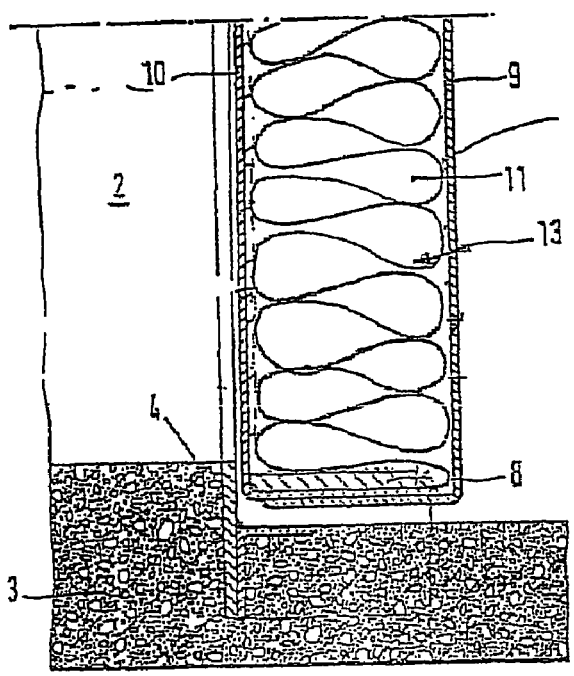
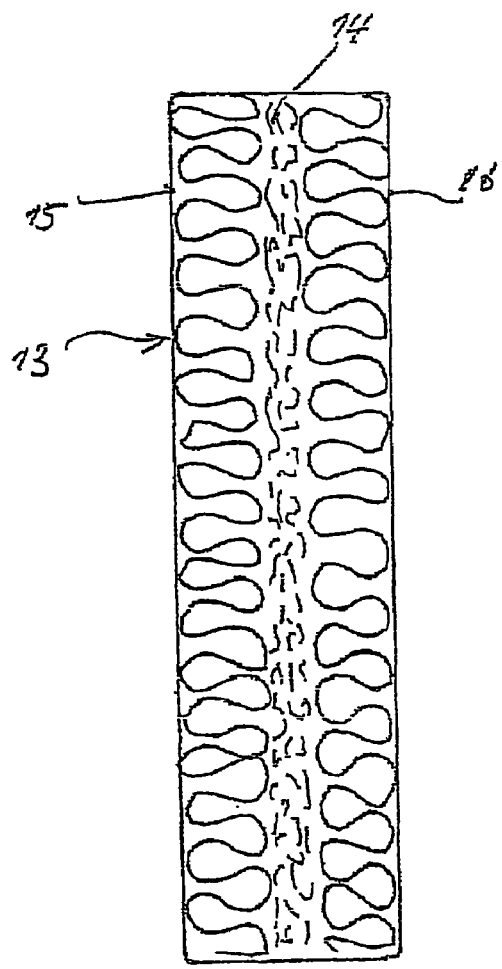

| Conventional rock wool | |
|---|---|
| Maximum: | 17,4 μm |
| D 50 | 4,7 μm |
| Arithmetic means | 5,3 μm |
| Standard deviation | 3,2 μm |
| Geometric means | 4,4 μm |

| Mineral wool according to invention | |
|---|---|
| Maximum: | 20,5 μm |
| D 50 | 3,2 μm |
| Arithmetic means | 4,1 μm |
| Standard deviation | 3,0 μm |
| Geometric means | 3,2 μm |

FIRE PROTECTION GATE AND CORRELATED FIRE PROTECTION INSET

CROSS REFERENCE TO RELATED APPLICATIONS

This application is a national stage application under 35 U.S.C. 371 of PCT Application No. PCT/EP2004/011062 having an international filing date of Oct. 4, 2004, which designated the United States, which PCT application claimed the benefit of European Application Serial No. 03022609.6, filed Oct. 6, 2003, and French Application Serial No. 0400084, filed Jan. 7, 2004, the entire disclosures of which are hereby incorporated herein by reference.

FIELD

The present invention refers to a fire protection gate respectively door with the features of preamble of claim 1, as well as to a correlate fire protection insert, according to pre-amble of claim 13.

BACKGROUND

The fire protection requirements of fire protecting elements are classified in fire resistance categories, according to DIN 4102, Part 5. The fire resistance capacity of a fire protecting gate is determined based on the duration, at which at a certain temperature increase on one side of the fire protection hate, the other "cold" side of the fire. The fire protection requirements of fire protecting elements are classified in fire resistance categories, according to DIN 4102, Part 5. The fire resistance capacity of a fire protecting gate is determined based on the duration, at which at a certain temperature increase on one side of the fire protection gate, the other "cold" side of the fire protection gate remains under a defined threshold temperature. These fire resistance categories are also valid for fire protection gates. The duration in minutes until the threshold temperature is being attained on the cold side, is designated the resistance time. This determines the classification in the different fire resistance categories. A classification of a fire protection gate in fire resistance category T30 implies in a minimum resistance time respective of T60 and T90, a 60 minutes and 90 minutes resistance time. During these resistance times, it must be insured that the room-closing effect of the fire protection gate is guaranteed, i.e. during these times, no flame may exit the gate on the side opposite to the fire, resulting from combustion of the firing load, i.e. organic binding agent.

As a consequence of the fire protection requirements relative to fire protection doors, as mineral wool insulating material for inserts of fire protection doors, predominantly rock wool is being used, in view of its high temperature resistance, who melting point according to DIN 4102, Part 17, should be around 1.000° C. Usually this type of rock wool is being produced pursuant to the so called nozzle blowing process or with external centrifugation, for example the so called cascade centrifugation process. The fibers thus produced normally present, according to their usage, an average geometric diameter above 4 to 12 μm, so that these fibers—compared to fiber of traditional glass wool—are relatively coarse. Glass wool fibers, on the other hand, according to these, feature an average geometric diameter in the range of 3 μm until 6 μm. In the case of rock wool, however, as a result of the production pursuant to the nozzle blowing process or with external centrifugation, forcibly a large portion of non fibrillated material in form of coarser fiber components results in the form of so-called "beads" with a particle size of at least 50 μm in the insulating material and commonly with a portion from 10 to 30% of the fiber portion of the insulating element. This comparably high bead portion participates of the weight of said insulating element, but does not contribute in any way to the desired insulating effect of the insulating element.

As binding element, for rock wool fibers, normally a phenol-formaldehyde resin is being utilized, which is being integrated into the fire protection gate as organic material, the so-called fire load. The content of binding agent which is required for the structural stabilization of the soft rock wool fleece for the formation of a solid plate of agglutinated rock wool, at fire protecting units is normally below 1 weight % (dry, referred to the fiber mass). Based on the coarse fiber structure of conventional rock wool, as compared to conventional glass wool, to form fire protection insets, high gross densities are needed, in order that the desired insulating effect may be attained. The gross density of such rock wool insets, according to the fire resistance category, is for example 120 $kg/m^3$ until 230 $kg/m^3$.

Such high gross densities, required to attain the desired insulating effect, at a given thickness of fire protection units for fire protection gates directly result in too heavy gate weights. In addition, a large density also forcibly implies that—considered on an absolute basis—a relatively large amount of binding agent and, consequently, fire load, is being introduced in the fire protection gate.

Since the thermal insulating effect of said rock wool inset, with predetermined thickness, separately is frequently insufficient to attain a required fire resistance category, it is often necessary to provide additional fire protection means, which, in the event of a fire, in consequence of the correlate temperature increase, liberate physically and/or chemically bound water, thus rendering slower the temperature increase. Such fire protection means may be applied in different layers, as is known from EP 0 741 003, or are integrated in the rock wool material specifically, as known from EP 1 097 807.

The high gross densities of the conventional rock wool materials, used for the fire protection insets, result not only to correspondingly high weights of the insets and, therefore, also of the fire protection gates, but additionally they imply in that as a result of their surface extent, during the manipulation, eventually during the introduction into the fire protection gate, the insets are exposed to high flexing loads due to their specific weight, featuring a trend to delaminate when being raised or even forming fissures. Therefore, an extremely careful manipulation of these fire protection insets is required, which has unfavorable results vis-à-vis a rational production. This mechanical instability of the inset evidences, as a consequence, that the procedure of introducing the inset into the gate box at many fire protection gate manufacturers is the only procedure, which so far could not be automatized.

Products with high gross density are being produced by a corresponding thickening of the fleece which forms the respective products. Said fleece, before and during their passage through the hardening oven, are being compressed by the compression forces acting upon them, in order to adjust a predetermined form, and after elimination of said compression forces, the hardened binding means accepts the profiling task. Inside the material of the rock wool, quite intensive resetting forces are active, which have to be offset through the effect of the binding agent. The stronger the material has been compressed, the more intensive are these forces, i.e. according to the extent of the gross density.

During the aging process of said rock wool material after integration of the fire protection gate, however, binding forces of the biding agent may be neutralized with the passage of time. As a result, the resetting forces, "frozen" as it were, are being liberated and the rock wool inset may bulge. The forces then incident may become so intense that their considerably deform the steel plate shells of the fire protection gate, so that the gate needs to be replaced.

In order to be able to dominate said resetting forces at a somewhat better level, in normal usage procedures were undertaken according to which in front of said hardening oven, a pressure cylinder exposes to local pressure said not hardened rock wool material, when fibers are being broken, i.e. are being filled. As a result, the resetting forces are somewhat reduced, but the consequence is that the fiber connection may be considerably damaged. Also the resistance of the inset will thus be affect; which may evidence unfavorable effects during their manipulation.

The rupture of fibers caused by the compression cylinder is liable to result, additionally, in a considerable formation of dust, so that dust and fiber particles, as well as beads, during the insertion of the fire protection inset into the gate box may generate impurities at said box. These impurities may result in erroneous adjustment during welded connection at the subsequent welding procedures to close the gate box with the gate cover, so that complex quality controls and eventual subsequent labor will be required.

SUMMARY

It is an object of the present invention to provide a fire protection gate according to preamble of claim 1, which eliminates the disadvantages of such fire protection gates based on traditional rock wool, and which is of lesser weight, and the fire protection inset should be reduced at least at the basis of 25% of its weight, without affecting requirements in the area of fire and operational safety.

Especially, notwithstanding the desired weight reduction, the mechanical stability of said fire protection insets should be adjusted in such a fashion, so as to facilitate, on one side, their manipulation and, on the other side, in order to avoid the formation of resetting forces, resulting from a reduction of the binding forces of the binding means, as a result of the aging process, and therefore the trend of bulging of the fire protection gate.

According to the invention, this task is being solved with the features of the characteristic parts of claim 1, and convenient additional embodiments of the invention are marked by the features of the dependent claims.

The fire protection gate of the invention is highlighted by a fire protection inset of at least one insulating element, at which, due to the adjusted cooperation of several factors, a fiber structure especially adapted for the determination of a fire protection gate is being defined and, at the same time, a high temperature resistance is being insured. The insulating element according to the invention features quite a fine fiber structure, resulting from the fact that the fibers of the insulating elements are designed for an average geometrical fiber diameter of $\leq 4$ μm. At the same time, the gross density is in the range of 60 to 130 kg/m$^3$ and the portion of the binding agent, relative to the mass of the fiber portion of the insulating elements, is 1 to 3 weight %, whereby the preferred range of the gross density at a fire resistance category T30 or similar is at 60 to 80 kg/m$^3$, preferably 70 kg/m$^3$, at a fire resistance category T60 or similar, at 80 to 110 kg/m$^3$, preferably 100 kg/m$^3$, and with a fire resistance category T90 or similar, at 110 to 130 kg/m$^3$, preferably 120 kg/m$^3$, resulting in corresponding weight reductions of the fire protection insets according to more than 30%. These are gross density areas which cannot be attained for fire protection insets of conventional rock wool. Considering the temperature resistance, it is possible in the process that the insulating element features a point of fusion according to DIN 4102, Part 17, of $\geq 1.000°$ C. With the finely designed mineral fiber with an average geometrical fiber diameter of $\leq 4$ μm, a fiber structure results at which, with similar gross density as with conventional rock wool fibers, an essentially large number of fibers is present in the structure and, therefore, also more crossing points to the fiber connection. With identical binding agent used as with conventional rock wool, as a result of the large number of crossing points and concentration of binding agents at these points, there is a considerable increase of the portion of binding material which contributes to an agglutation, resulting in a fiber connection with results in a comparably more rigid configuration of a hardened mineral fiber plate. From the reduced gross density of 60 to 130 kg/m$^3$ there results, therefore, for the fire protection inset according to the invention, with similar density as conventionally used, there results directly a more reduced fiber mass. In this way, with identical absolute organic fire load, i.e. binding agent applied, correspondingly a large relative binding agent portion may be adjusted, with the consequence that the plate will become comparably more rigid. On the other side, with the insulating plate of the invention, a predetermined rigidity and stability may also be attained with a comparably lower absolute binding agent application, again resulting the fire load applied, normally introduced by means of the normally organic binding agent. At the same time, as a consequence of the fine fiber structure, the portion of air essential for the insulating effect inside the insulating element, resulting in a corresponding increase of the insulating effect.

As a consequence of adjusting the alkali/earth alkaline-mass relationship to a value of <1, there results a relatively high temperature resistance to meet the requirements of the normative fire resistance categories or similar provisions of mineral fibers of the insulating element according to the invention.

Due to synergistically cooperation measures according to the invention, there results, thus, a fire protection gate which, as a consequence of the reduced gross density of the fire protection inset is highlighted by a more reduced with, with outstanding insulating properties, with at least comparable rigidity and high temperature resistance. In principle, the invention creates a symbiosis between glass wool and rock wool and combines, thus, adequately their advantageous properties, the insulating element being applied upon a fibrous structure, similar to glass wool, presenting, however the advantages of high temperature resistance of conventional rock wool. As a consequence of the higher fiber fineness, it is thus possible to attain a certain insulating effect with identical geometry with considerably reduced gross density than with traditional rock wool, and this results, therefore, in corresponding economies of material vis-à-vis conventional fire protecting insets.

In addition, during the production of the insulating elements for the fire protection gate it is possible to work with considerably lower compression rate, so that also minor resetting forces have to be "frozen". If, as a consequence of aging, there should be a progressive elimination of the binding forces of the binding agent, then in the fiber connection according to the invention, low forces are being liberated, so that a bulging of the fire protection gate is being avoided and therefore the duration of the fire protection gate may be essentially extended, as compared to conventional fire protection gates.

As a consequence of the improved stability in the connection with lower gross density and lower weight, also the manipulation of the insulating element becomes easier with the purpose of assembling the fire protection gates, since a delamination, rupture or even fragmentation at the suspension of the fire protection inset is no longer to be feared. Especially the process step of inserting such a fire protection inset into the gate box becomes also accessible to automatization.

With a divided gross density, an identical relative binding agent content also implies in a division of the absolute application of binding agent, so that according to the invention also a far lower fire cargo is being applied upon the fire protection gate and, therefore, an essential contribution is being provided to attain higher fire resistance categories. Therefore, fire protection insets according to the invention may be produced with a larger relative binding agent portion, since as a consequence of the fine fiber structure in connection with the reduced gross density, relatively more binding agent is available for the fiber connection, with simultaneous decline of the absolute binding agent content of the convention rock wool inset and, therefore, the fire protection inset may be adjusted correspondingly rigid with absolute lower binding agent portion. In other words: With the fire protection inset according to the invention, it is advantageously possible to create a product which—with optimized mechanical properties—features a lower absolute binding agent application vis-à-vis conventional products. As binding agent, an organic binding agent is indicated, and the preferred range of the portion of binding agent, referring to the fiber mass of the insulating elements, is situated in the range of 1 to 2 weight %.

The average geometric diameter, responsible for the fiber fineness, is determined from the frequency distribution of the fiber diameter. The frequency distribution may be determined based on a wool sample with a microscope. The diameter of a large number of fibers is being measured and applied, resulting in an oblique left-sided distribution pattern (see FIGS. 4 and 5).

In a special adequate form, the mineral fibers of the insulating element are being produced by internal centrifugation according to the centrifuging basket process with a temperature at the centrifuging basket of at least 1.100° C. In this way, it is possible to produce, in a simple fashion, fibers with correspondingly low average geometric diameter, and the mineral wool thus obtained is practically exempt of beads, meaning the bead portion in the mineral wool material is <1%, which feature another essential advantage vis-à-vis conventional rock wool. Fiber rupture and consequent formation of dust are, thus, avoided in the best possible fashion, so that the fire protection insets according to the invention may be integrated exempt of problems and interference in the gate boxes. The procedure of internal centrifugation according to the centrifuging test process is already known for mineral fibers, and expressly reference is being made to EP 0 551 476, EP 0 583 792, WO 94/04468 and U.S. Pat. No. 6,284,684 for more details.

In a specially advantageous form, the resetting forces, measured as pressure tension with 10% buckling according to DIN EN 826 of the insulating element, integrated into the fire protection gate in a fire resistance category T30 or similar represents <4 kPa, with a fire resistance category T60 or similar <6 kPa and with a fire resistance category T90 or similar, <8 kPa. These reduced resetting forces, as already explained above, contribute for extending the duration and avoid failures due to buckling of the fire protection gates.

In the context of the invention, it is also possible to utilize the known additional measures, such as integration of fire protecting agent in the form of dehydrating materials, such as metal hydroxides, and especially aluminum hydroxide is being used. It is convenient in this case that these fire protection agents, integrated in the insulating element, are disposed in at least a discrete layer between the mineral fibers of said insulating element. This discrete layer is conveniently formed in plane form, being disposed parallel to the main surface of the insulating element, normally present in the form of a plate. Alternately, however, it is also possible that the distribution of the dehydrating fire protection agent is being accomplished inside the discrete layers in the form of belts and/or points. It is also possible that the dehydrating substance is homogeneously distributed in the insulating element.

Advantageously, the fire protection insets are formed of mineral fibers, soluble in a physiological milieu, corresponding to the demands of the European Guideline 97/69/EG and/or the demands of the German Norm for Dangerous Products, Section IV, No. 22, thus insuring absence of dangers for the health with the fire protection insets at their production, processing utilization and elimination. For clarification it is adhered that references to standards and examination requirements respectively refer to the current version of the filing date.

Subsequently, Table 1 indicates the preferred composition of the mineral fibers of a fire protection inset, according to the invention, the indication being made per sections in weight % figures.

TABLE 1

| | | | |
|---|---|---|---|
| $SiO_2$ | 39-55% | preferably | 39-52% |
| $Al_2O_3$ | 16-27% | preferably | 16-26% |
| CaO | 6-20% | preferably | 8-18% |
| MgO | 1-5% | preferably | 1-4.9% |
| $Na_2O$ | 0-15% | preferably | 2-12% |
| $K_2O$ | 0-15% | preferably | 2-12% |
| $R_2O$ ($Na_2O + K_2O$) | 10-14.7% | preferably | 10-13.5% |
| $P_2O_5$ | 0-3% | especially | 0-2% |
| $Fe_2O_3$ (iron altogether) | 1.5-15% | especially | 3.2-8% |
| $B_2O_3$ | 0-2% | preferably | 0-1% |
| $TiO_2$ | 0-2% | preferably | 0.4-1% |
| Other | 0-2.0% | | |

A preferred smaller range of $SiO_2$ is 39-44%, particularly 40-43%. A preferred smaller range for CaO is 9, 5-20%, particularly 10-18%.

The composition according to the invention relies on the combination of a high $Al_2O_3$-content, of between 16 and 27%, preferably greater than 17% and/or preferably less than 25%, for a sum of the network-forming elements —$SiO_2$ and $Al_2O_3$— of between 57 and 75%, preferably greater than 60% and/or preferably less than 72%, with a quantity of alkali metal (sodium and potassium) oxides ($R_2O$) that is relatively high but limited to between 10-14.7%, preferably 10 and 13.5%, with magnesia in an amount of at least 1%.

These compositions exhibit remarkably improved behaviour at very high temperature.

Preferably, $Al_2O_3$ is present in an amount of 17-25%, particularly 20-25%, in particular 21-24.5% and especially around 22-23 or 24% by weight.

Advantageously, good refractoriness may be obtained by adjusting the magnesia-content, especially to at least 1.5%, in particular 2% and preferably 2-5% and particularly preferably ≧2.5% or 3%. A high magnesia-content has a positive effect which opposes the lowering of viscosity and therefore prevents the material from sintering.

In case $Al_2O_3$ is present in an amount of at least 22% by weight, the amount of magnesia is preferably at least 1%, advantageously around 1-4%, preferably 1-2% and in particular 1.2-1.6%. The content of $Al_2O_3$ is preferably limited to 25% in order to preserve a sufficiently low liquidus temperature. When the content of $Al_2O_3$ is present in a lower amount of for example around 17-22%, the amount of magnesia is preferably at least 2%, especially around 2-5%.

A fire protection inset with the features as defined above, represents a component which may be independently marketed, which normally is being provided by the mineral fiber producer to the fire protection gates producers. It is highlighted by the advantages as described above, with a view to increase stability, insulating effect and fire protecting behavior, such as reduced weight.

BRIEF DESCRIPTION OF THE DRAWINGS

Subsequently, preferred embodiments of the invention will be described, based on the drawing. The figures show:

FIG. 1 section of a fire protection gate according to the invention with fire protection inset according to the invention, as well as FIG. 2 a modified embodiment of a fire protection insets with additionally integrated fire protection agent, FIG. 3 a diagram of the comparative essay in the context of a thermal conductivity essay at 400° C., FIG. 4 a typical fiber histogram of a conventional rock wool, and FIG. 5 a typical fiber histogram of mineral wool according to the invention.

DETAILED DESCRIPTION

Figure 3:
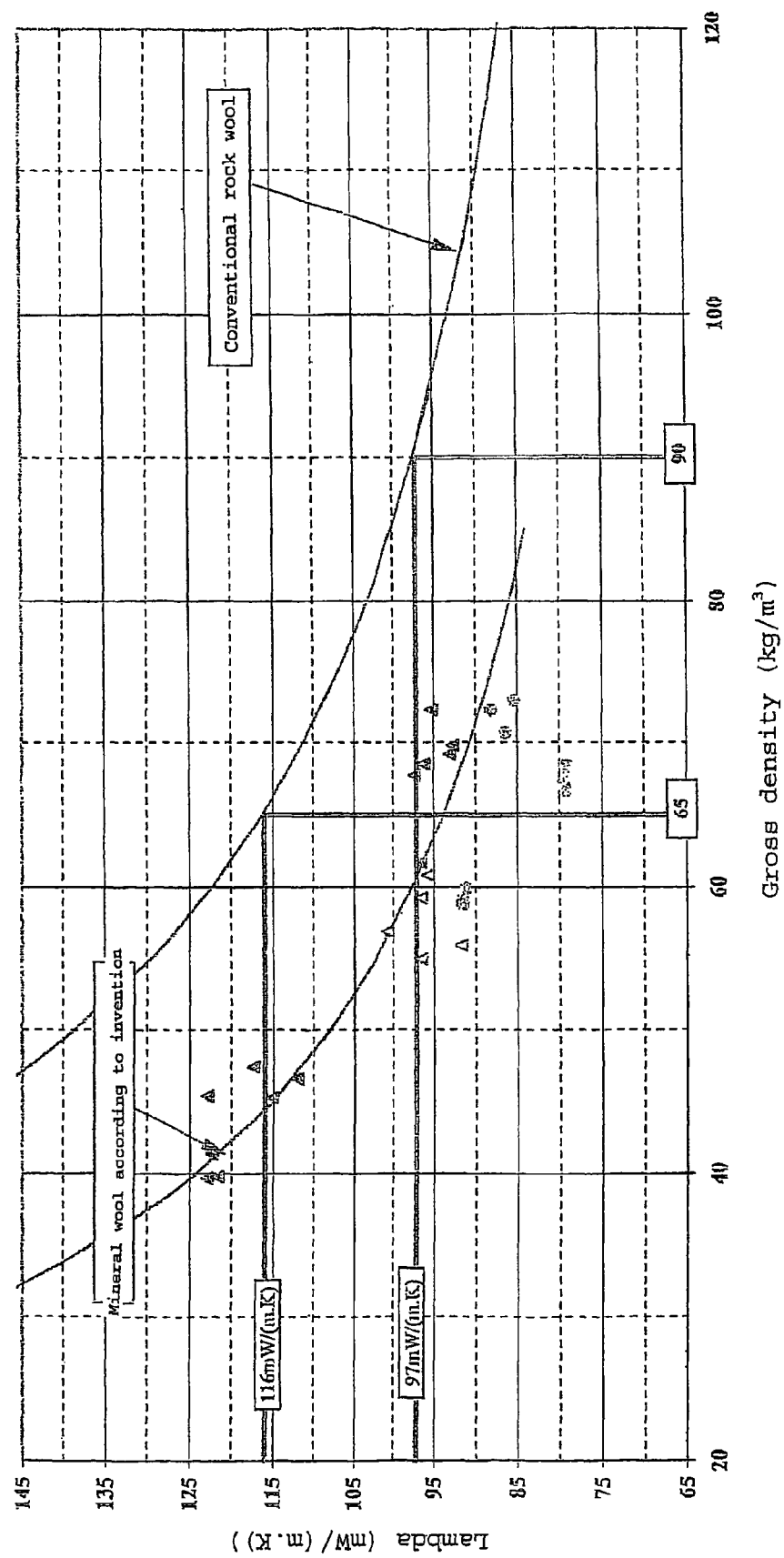

The fire protection door, generally designated with number 1 in FIG. 1, is integrated in a gate opening of the masonry of a fire-protected room 2, with a bottom 3 with lower shoulder 4 and a cover 5, with upper shoulder 6. The framework of said fire protection gate 1 may be partially recognized on top at 7 and below at 8. In addition, two steel plate shells 9 and 10 are provided. Inside the room 11, involved by said steel plate shells 9 and 10, a fire protection inset 133 according to the invention is disposed. At 12 presents a schematic indication of a gate closing device, which is not an object of the present invention.

The fire protection inset 13, integrated between said steel plate shells 9 and 10 of said fire protection gate 1, in the exemplified case consists of a plate of mineral wool fibers, whose composition is indicated in the right column of Table 3, so that an alkali/earth alkaline-mass relation <1 and a fine fiber structure with an average geometric fiber diameter of 3.2 µm is present. From this results quite a fine fiber structure of the mineral wool structure according to the invention, with an intimate cross linking as a consequence of the larger number of crossing points of the fiber connection.

FIG. 2 shows another embodiment of a fire protection inset 13, in which a layer 14 is integrated with dehydrating substance under thermal influence, in plane alignment, parallel to both main surfaces 15 and 16 of said insulating element, configured as a plate. As dehydrating substance, especially aluminum hydroxide is being utilized. Layer 14 may be continuous, however selectively also in the form of stripes and/or points. Instead of a discrete layer 14 in case of need also various discrete layers may be provided or the dehydrating substance may also be provided homogeneously distributed.

In an essay, a fire protection insets of traditional rock wool, integrated in a fire protection gate and a fire protection inset, according to the invention, of a so-called large fire test, according to DIN 4102, Part 5, were compared, with which the preservation of fire resistance category T90 was tested. With identical dimensions of both fire protection gates with construction norm 1000 mm×2125 mm and a thickness of 65 mm, corresponding to a thickness of the fire protection insets of 63 mm, the gross density of the conventional fire protection inset was 210 kg/m$^3$ with a binding agent content of 0.9 weight % with an average geometric diameter of 4.4 µm and of the fire protection inset according to the invention of 120 kg/m$^3$ with an binding agent content of 1.5 weight % with an average geometric diameter of 3.2 µm.

After 90 minutes duration of the essay, the maximum admissible temperature increase of 180 K was not surpassed on the side of the fire protection gate not turned towards the fire at any of the measuring points, stipulated according to Norm DIN 4102, Part 5. Also at no point a projection of fire was notified, based on combustion of the organic fire load.

The following Table 2 unites the measured values of this essay, and from the totality of measuring points, those were reproduced which are spatially integrated in the upper critical area of the gate, at the points of largest temperature load.

TABLE 2

| Measuring point | Fire protection inset according to invention | Conventional fire protection inset | Difference |
|---|---|---|---|
| 6 | 144 K | 179 K | 35 K |
| 12 | 142 K | 170 K | 28 K |
| 13 | 133 K | 170 K | 37 K |
| 14 | 133 K | 146 K | 13 K |
| 15 | 133 K | 159 K | 26 K |

Table 2 features, thus, that both constructions fulfill the demands for classification into fire resistance category T90, which, however, in the case of the fire protection gate provided with a fire protection inset according to the invention, is attained with a more than 40% lighter component, as compared to a fire protection inset of conventional rock wool.

As can furthermore be seen from the temperature differentials, indicated in Table 2, the fire protection gate with the fire protection inset according to the invention, offers a clearly improved fire resistance, so that especially another potential for weight reduction and economy of material is provided, as compared with a conventional fire protection inset.

Corresponding comparable tests were also conducted for checking the fire resistance category T30 and T60, so that the measurement was taken after 30 minutes respectively 60 minutes. The corresponding norm DIN 4102, Part 5 hereby provides a face plan for the position of the individual measuring points MW. Two requirements have to be fulfilled for a successful test. The first requirement is that the measuring points MW 1-5 have to be ≦140 K taken as average. The further requirement is that all individual values, therefore the measuring points 1-17, respectively have to be ≦180 K. This applies to T30, T60 as well as the before-mentioned T90 examination. Again compared was an IM insulation material element (IM means inventive mineral wool) according to invention with an insulation material element made of conventional rock wool, here of the type Sillan40. The results hereto are shown in table 3, whereby the average value for the melting points MW 1-5 are respectively indicated in Kelvin and the individual values of measuring points 16 and 17 are also given, also in Kelvin. Measuring points MW 6 to 15 are not shown in the tables, however the requirements were still fulfilled.

The IM insulation material element in these tests features a far lesser gross density than conventional rock wool. Therefore the gross density of the IM insulation material element for T30 was only 83 kg/m³, whereby the gross density of conventional rock wool Sillan40 was 147 kg/m³. The gross density of the insulation material element for T60 was 120 kg/m³, whereas Sillan40 was 294 kg/m³. That means that the fire protection inlet with the insulation element according to invention fulfills the examination requirements at far lesser gross densities that the insulation element made of conventional rock wool (type Sillan40).

TABLE 3

| T30 measuring points after 30 min | | | T60 measuring points after 60 min | | |
|---|---|---|---|---|---|
| measuring points | IM | Sillan40 | measuring points | IM | Sillan40 |
| MW 1-5 | 63.8 | 94 | MW 1-5 | 133 | 105 |
| 16 | 94.1 | 165 | 16 | 165 | 158 |
| 17 | 84 | 160 | 17 | 174 | 168 |
| Gross density IM 83 kg/m³ | | | Gross density IM 120 kg/m³ | | |
| Gross density Sillan40 147 kg/m³ | | | Gross density Sillan40 294 kg/m³ | | |

In a second essay, a fire protection inset according to the invention was submitted to fire essays, the so-called small fire essays according to DIN 18089-1, based as correlation tests on the results of large fire essays and the result of the small fire essays was compared with the result of a small fire test for an admissible fire protection inset of conventional rock wool, and the preservation of fire resistance category T30 was examined.

With identical outer dimensions of 500 mm×500 mm and a thickness of 52 mm, the gross density of the fire protection inset of conventional rock wool is 140 kg/m³, with an average geometrical diameter of 4.4 μm and of said fire protection inset according to the invention representing 80 kg/m³, with an average geometric diameter of 3.2 μm. The binding agent content is not important with this essay, since in this case by jeans of the essay disposition only the thermal passage through the product is being measure as decisive parameter for the fire behavior.

As threshold value for preservation of the criteria of fire resistance category T30, the permission for the fire protection inset of conventional rock wool with the mentioned dimensions and densities, verifies that at the end of essays time of 30 minutes, no individual value of the repeatedly accomplished essays may surpass a temperature increase of 100 K at the side not turned towards the fire. This threshold value is resulting from the maximum temperature increase on the cold side of the small fire essay, accomplished, as a correlation essay, based on the large fire essay, successfully approved. With identical outer dimensions, the maximum temperature increase of the fire protection inset according to the invention, after 30 minutes, advantageously was only of 62 K.

The comparative test for the classification in the fire resistance category T30 shows that the fire protection inset according to the present invention fulfils in an exceeding manner the threshold value requirements applicable to the admitted conventional fire protection inset, although with the fire protection inset according to the invention, an approximately 40% lighter element was present, as compared with a conventional fire protection inset of traditional rock wool.

The large differential of the fire protection inset according to the invention of 38 K of the maximum individual value of the temperature increase on the side not turned towards the fire therefore creates possibilities for an addition weight reduction and/or increase of the relative organic binding agent portion in the fire protection element according to the invention.

The respective composition in weight % of the conventional fire protection inset <i.e. formed with traditional rock wool, as well as the fire protection inset of the invention, results from Table 3, with both fire protection insets featuring a point of fusion of at least 1000° C. according to DIN 4102, Part 17.

TABLE 4

| | Composition | |
|---|---|---|
| Material | Conventional fire protection inset | Fire protection inset according to invention |
| $SiO_2$ | 57.2 | 41.2 |
| $Al_2O_3$ | 1.7 | 23.7 |
| $Fe_2O_3$ | 4.1 | 5.6 |
| $TiO_2$ | 0.3 | 0.7 |
| CaO | 22.8 | 14.4 |
| MgO | 8.5 | 1.5 |
| $Na_2O$ | 4.6 | 5.4 |
| $K_2O$ | 0.8 | 5.2 |
| $P_2O_5$ | | 0.75 |
| MnO | | 0.6 |
| SrO | | 0.5 |
| BaO | | 0.34 |
| Total | 100 | 99.89 |

FIG. 3 represents, in the form of a diagram, the measuring series of a thermal conductivity essay at 400° C. above the gross density. The measurement results were determined pursuant to DIN 52612-1 with a so-called double-plate instrument.

It can be seen in a simple fashion from this diagram, which potential of economy is feasible in connection with fire protection gates, when utilizing the mineral wool according to the invention, compared with conventional rock wool, and this is shown, for example, for two gross densities of 65 and 90 kg/m³. The identical thermal conducting capacity of 116 mW/mK, which is being attained with convention rock wool with a gross density of 65 kg/m³, is being obtained with the mineral wool of the invention already with a gross density of approximately 45 kg/m³, i.e. with an economy of weight of the order of approximately 31%. In an analog fashion, with a gross density of 90 kg/m³ of convention rock wool, with the mineral wool according to the invention, there is a weight economy of approximately 33%.

Figure 4:
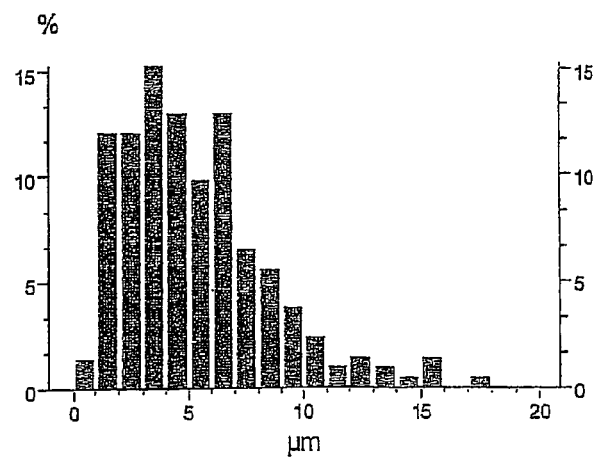
Figure 5:
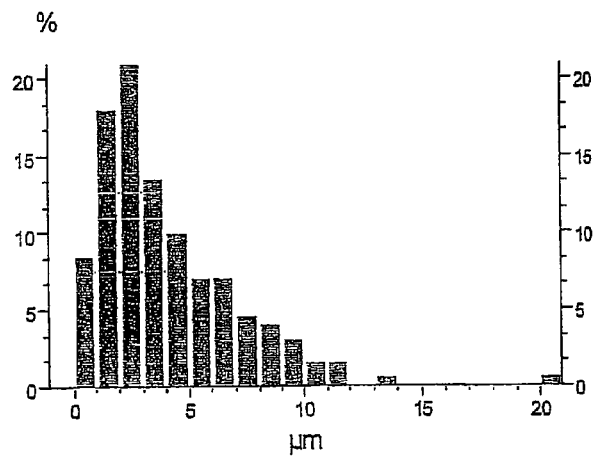

Finally, FIG. 4 shows a typical fiber histogram of a fire protection inset for the conventional rock wool, mentioned in the description, and FIG. 5 indicated such a histogram of the fibers of a fire protection inset according to the invention.

What is claimed is:

1. A fire protection gate, comprising:
    bilateral steel plate shells, with a temperature resistant fire protection inset located between said bilateral steel plate shells;
    at least one insulating element in the form of a plate, said at least one insulating element comprised of mineral fibers soluble in a physiological milieu and at least one binding agent, said mineral fibers of said at least one insulating element having an alkali/earth alkali mass ratio of <1 and the fiber structure of said at least one insulating element is determined by an average geometrical fiber diameter less than or equal to 4 um (microns); and
    wherein a portion of the binding agent, relative to a mass of the fiber content of the insulating element is in the range of 1 to 3 weight % and has a gross density in the range of 60 to 130 kg/m³.

2. The fire protection gate according to claim 1, wherein said binding agent is an organic binding agent.

3. The fire protection gate according to claim 1, wherein a portion of said binding agent, relative to the fiber mass of said at least one insulating element, is within the range of 1 to 2% by weight.

4. The fire protection gate according to claim 1, wherein said at least one insulating element has a point of fusion according to DIN 4102, Part 17, of $\geq 1,000°$ C.

5. The fire protection gate according to claim 1, wherein said mineral fibers of said at least one insulating element are produced by internal centrifugation with a centrifuging basket temperature of at least 1,000° C.

6. The fire protection gate according to one of the preceding claim 1, wherein the resetting force, measured as pressure tension at 10% sprain according to DIN EN 826 of said at least one insulating element, integrated in said fire protection gate meets at least one of the following:
   at a fire resistance category T30, amounts to <4 kPa;
   at a fire resistance category of T60, amounts to <6 kPa; and
   at a fire resistance category of T90, amounts to <8 kPa.

7. The fire protection gate according to claim 1, wherein said at least one insulating element features a dehydrating substance under thermal influence.

8. The fire protection gate according to claim 7, wherein said dehydrating substance is integrated in at least a discrete layer between said mineral fibers of said at least one insulating element, the discrete layer, being in a plane aligned parallel to a main surface of said insulating element.

9. The fire protection gate according to claim 8, wherein said dehydrating substance is provided homogeneously in said at least one insulating element.

10. The fire protection gate according to claim 1, wherein said fiber content of said at least one insulating element is within the following ranges in % by weight:

| | |
|---|---|
| $SiO_2$ | 39-55 |
| $Al_2O_3$ | 16-27 |
| CaO | 6-20 |
| MgO | 1-5 |
| $Na_2O$ | 0-15 |

-continued

| | |
|---|---|
| $K_2O$ | 0-15 |
| $R_2O$ ($Na_2O + K_2O$) | 10-14.7 |
| $P_2O_5$ | 0-3 |
| $Fe_2O_3$ (iron altogether) | 1.5-15 |
| $B_2O_3$ | 0-2 |
| $TiO_2$ | 0-2 |
| Other | 0-2.0 |

11. The fire protection gate according to claim 1, wherein said at least one insulation element has a bead portion.

12. The fire protection gate according to claim 2, wherein said organic binding agent is phenol formaldehyde resin.

13. The fire protection gate according to claim 1, wherein said at least one insulating element has a gross density at a fire resistance category T30 of between about 60 to 80 kg/m³.

14. The fire protection gate according to claim 1, wherein said at least one insulating element has a gross density at a fire resistance category T60 of between about 80 to 110 kg/m³.

15. The fire protection gate according to claim 1, wherein said at least one insulating element has a gross density at a fire resistance category T90 of between about 110 to 130 kg/m³.

16. The fire protection gate according to claim 7, wherein said dehydrating substance comprises aluminum hydroxide.

17. The fire protection gate according to claim 10, wherein said fiber content of said at least one insulating element is within the following ranges % by weight:

| | |
|---|---|
| $SiO_2$ | 39-52 |
| $Al_2O_3$ | 16-26 |
| CaO | 8-18 |
| MgO | 1-4.9 |
| $Na_2O$ | 2-12 |
| $K_2O$ | 2-12 |
| $R_2O$ ($Na_2O + K_2O$) | 10-13.5 |
| $P_2O_5$ | 0-2 |
| $Fe_2O_3$ (iron altogether) | 3.2-8 |
| $B_2O_3$ | 0-1 |
| $TiO_2$ | 0.4-1 |

* * * * *